US005764393A

United States Patent [19]

Okamura et al.

[11] Patent Number: 5,764,393

[45] Date of Patent: Jun. 9, 1998

[54] DATA TRANSMISSION CONTROL DEVICE OF RADIO SELECTION CALL RECEIVER

[75] Inventors: Hidetoshi Okamura; Hiroshi Ono, both of Tokyo, Japan

[73] Assignee: NEC Corporation, Tokyo, Japan

[21] Appl. No.: 607,459

[22] Filed: Feb. 27, 1996

[30] Foreign Application Priority Data

Feb. 28, 1995 [JP] Japan .................................... 7-064964

[51] Int. Cl.$^6$ ...................................................... H04B 10/16

[52] U.S. Cl. .......................... 359/145; 359/152; 359/158; 359/161; 359/174; 340/825.44

[58] Field of Search .................................... 359/145, 174, 359/176, 161, 158, 152, 153; 340/825.44, 311.1

[56] References Cited

U.S. PATENT DOCUMENTS 4,804,955 2/1989 Yoshizawa .
4,885,766 12/1989 Yosuoka et al. ........................ 359/145

FOREIGN PATENT DOCUMENTS 62-268219 11/1987 Japan .
3226029 10/1991 Japan .
445620 2/1992 Japan .
405091021 4/1993 Japan .................................... 359/145

*Primary Examiner*—Leslie Pascal
*Attorney, Agent, or Firm*—Sughrue, Mion, Zinn, Macpeak & Seas, PLLC

[57] ABSTRACT

A RAM (14) stores reception information received in a radio section (2). An infrared I/F transmission section (20) outputs inputted data to the outside by infrared ray. A decoder (8) detects a received signal from the radio section and conducts control so that the radio section is operated only at necessary state, and also outputs an infrared data transmission control signal so that the transmission operation in the infrared I/F transmission section can be stopped at the definite time before the operation start of the radio section. A CPU (10) sends the reception information stored in the RAM (14) to the infrared I/F transmission section based on an infrared data transmission control signal when transmission command is operated from the outside, and also conducts control so that the reception information can be transmitted from the infrared I/F transmission section.

15 Claims, 6 Drawing Sheets

BATCH STREAM

RADIO SECTION OPERATION CONTROL SIGNAL

INFRARED DATA TRANSMISSION CONTROL SIGNAL

DATA TRANSMISSION CONTROL DEVICE OF RADIO SELECTION CALL RECEIVER

BACKGROUND OF THE INVENTION

1. Field of the Invention

The present invention relates to a radio selection call receiver, and more particularly to a radio selection call receiver with data transmission function where information such as received data is outputted to an external data terminal or the like.

2. Description of the Prior Art

As a radio selection call receiver, that of multiple function type is practicable where a reception record or message information can be outputted to an external data terminal or the like.

In such a receiver, in order to output data to the outside, a method using an electrode is disclosed, or a method using a light emitting element is disclosed in Japanese Laid-Open Patent Application No. 268219/1987 (JP-A-62-268219).

In the radio selection call receiver disclosed in JP-A-62-268219, a light emitting element to conduct call notification visually is used also for outputting data to the outside, and in order to prevent confusion of operation, a synchronous signal and a finishing signal are inserted before and after the data to be outputted to the outside so that the call notification signal and the data to be outputted to the outside can be distinguished.

In such a radio selection call receiver in the prior art, when a light emitting element to conduct call notification is used also for outputting data to the outside, a circuit must be provided for inserting a synchronous signal before the data to be outputted to the outside and for inserting a finishing signal after the data, and a problem exists in that the circuit configuration is complicated.

Therefore, a radio selection call receiver provided with an infrared emitting element for outputting data to the outside separately from a light emitting element to conduct call notification and having function of transmitting the data to the outside by ultraviolet ray may be constituted.

In such a radio selection call receiver, in order to drive an infrared emitting element, a step-up circuit for stepping-up voltage of a primary power source such as a dry cell is necessary. Also consumption current in an infrared interface transmission section comprising an infrared emitting element and a drive circuit is very large in comparison with that in other circuit blocks.

Also transmission processing of infrared data from an infrared interface transmission section is independent of a radio section, and the transmission processing is conducted by transmission instruction of infrared data from the outside.

Consequently in such a radio selection call receiver with infrared data transmission function, when infrared transmission operation is conducted during reception operation in a radio section or when reception operation is started during infrared transmission operation, consumption current from a primary power source is varied significantly by operation of an infrared interface transmission section, and a problem is produced in that reception sensitivity of the radio section is deteriorated by noise generated from a step-up circuit.

In a radio selection call receiver disclosed in JP-A-03-226029, it is proposed that a secondary cell to drive a speaker or a vibrator for notifying call is installed separately, so that even if the notifying means is driven, a power source line of a radio section is not affected. However, in the radio selection call receiver disclosed in JP-A-03-226029, a plurality of secondary cells are necessary. Also deterioration of the reception sensitivity in the radio section cannot be prevented.

Also in a radio selection call receiver disclosed in JP-A-04-45620, it is proposed that a resistor is inserted in a signal line between ICs so that high frequency noise flowing in the signal line is reduced. However, deterioration of the reception sensitivity in the radio section cannot be prevented.

SUMMARY OF THE INVENTION

An object of the present invention is to provide a radio selection call receiver which solves the above-mentioned problems in the prior art.

Another object of the invention is to provide a radio selection call receiver where deterioration of the reception sensitivity affected by noise generated during infrared data transmission can be prevented.

Still another object of the invention is to provide a radio selection call receiver with infrared data transmission function where the timing of reception operation in a radio section and infrared data transmission operation to the outside can be made not to be overlapped.

A communication apparatus with infrared data transmission function according to the present invention includes a radio section receiving signals from the outside by radio, a memory section storing reception information received in the radio section, an infrared data transmission section outputting the reception information stored in the memory section and/or the reception information received in the radio section by infrared ray, and a control section stopping transmission operation in an infrared data transmission section by operation from the outside when the reception information is transmitted from the infrared data transmission section, if the radio section is operated.

The control section preferably includes a signal detection section detecting whether a signal received in the radio section is a signal to be received or not, a radio section operation control signal generator outputting a control signal to control operation of the radio section by the detection result of the signal detection section, and an infrared data transmission control signal generator effecting decision whether the radio section is operated or not and outputting a signal to stop the transmission operation when the radio section is operated.

The communication apparatus of the invention further comprises an infrared data transmission control section controlling the data transmission so that reception information is supplied to the infrared data transmission section during operation from the outside and can be transmitted from the infrared data transmission section.

The infrared data transmission control section preferably effects decision whether a signal to stop the transmission operation is supplied or not during operation from the outside. The communication apparatus of the invention is preferably a radio selection call receiver.

Also the control section of the invention may stop the transmission section at predetermined time before the operation start of the radio section, when the reception information is transmitted from the infrared data transmission section by operation from the outside.

In this case, the infrared data transmission control signal generator effects decision whether the radio section is operated or not, and outputs a signal to stop the transmission operation before the operation start of the radio section.

Also the infrared data transmission control section includes a decision section effecting decision whether a signal to stop the transmission operation is supplied or not during operation from the outside, and a time control section controlling the predetermined time based on data error information from the data error detection section.

A method of controlling transmission of infrared data in the communication apparatus of the invention comprises step of receiving a signal from the outside by radio, step of storing reception information received in the radio section, step of outputting the reception information stored in the memory section and/or the reception information received in the radio section by infrared ray, and step of stopping the transmission operation in the infrared data transmission section by operation from the outside, when the reception information is transmitted from the infrared data transmission section, if the radio section is operated.

Further, a method of controlling transmission of infrared data in the communication apparatus of the invention comprises step of receiving a signal from the outside by radio, step of storing reception information received in the radio section, step of outputting the reception information stored in the memory section and/or the reception information received in the radio section by infrared ray, and step of stopping the transmission operation in the infrared data transmission section by operation from the outside, when the reception information is transmitted from the infrared data transmission section, at the predetermined time before the operation start of the radio section.

According to the configuration as above described, during operation of the radio section, the transmission operation in the infrared data transmission section is stopped thereby the radio section is not affected by noise generated from the step-up circuit during the infrared transmission.

Also the transmission operation in the infrared data transmission section is stopped at the definite time before the operation start of the radio section thereby the radio section is not affected by noise remaining in the step-up circuit after stopping operation of the infrared data transmission section.

Also the intermittent operation of the radio section is controlled by the decoder thereby while operation of the radio section is turned off the reception information can be outputted from the infrared data transmission section to the outside, and the timing of the reception operation in the radio section and the infrared transmission operation is made not to be overlapped thereby the radio section is not affected by noise.

Also the transmission stop timing in the infrared data transmission section is varied corresponding to the error ratio of data received in the radio section thereby the radio section is not further affected by noise remaining in the step-up circuit after stopping operation of the infrared data transmission section.

BRIEF DESCRIPTION OF THE DRAWINGS

These and other objects, features and advantages of this invention will become more fully apparent from the following detailed description taken with the accompanying drawings in which.

In the drawings, the same reference numerals denote the same structural elements.

DESCRIPTION OF THE PREFERRED EMBODIMENTS

Embodiments of the present invention will be described in detail referring to the accompanying drawings.

Figure 1:
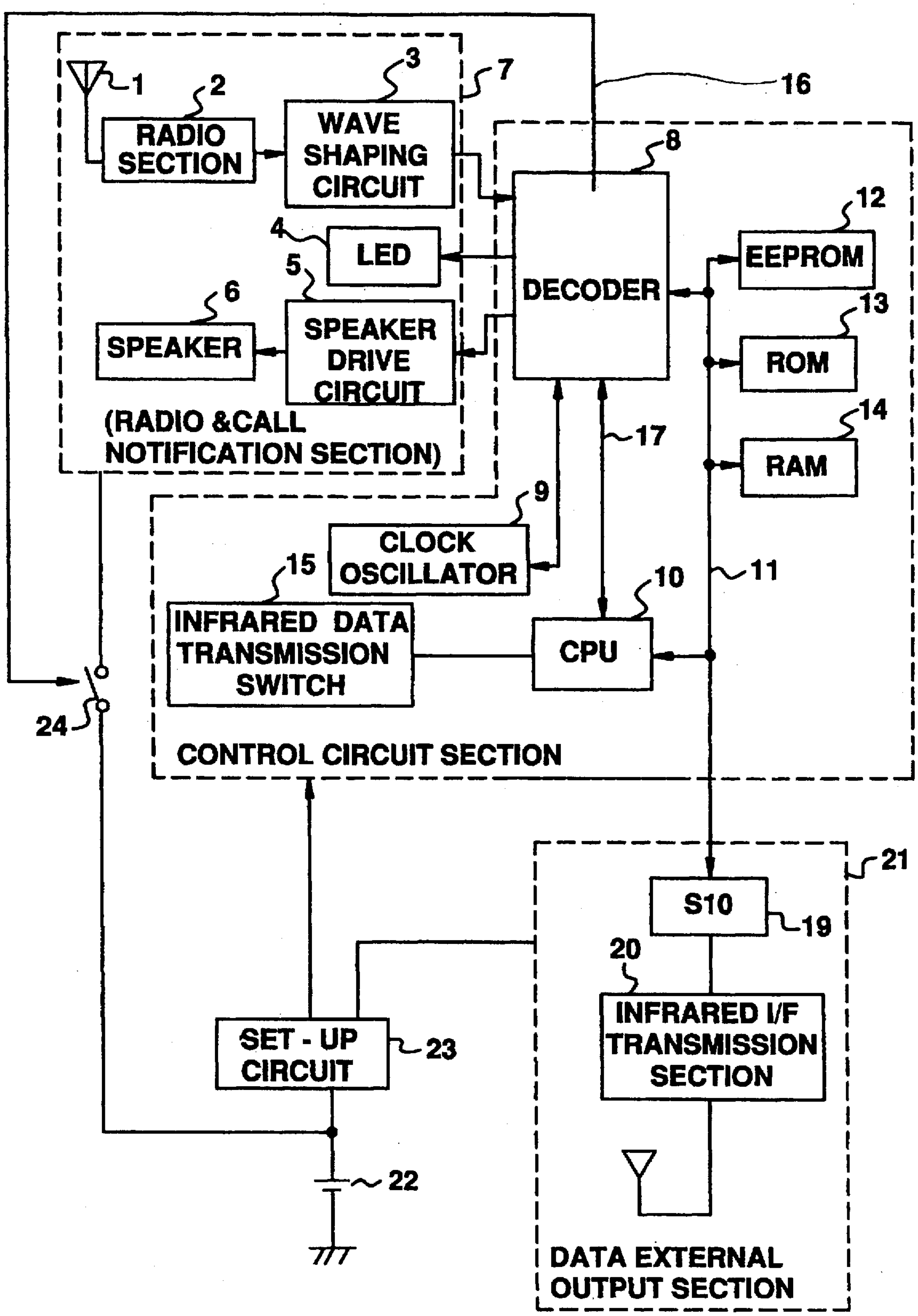
FIG. 1 is a block diagram showing an embodiment of a radio selection call receiver with infrared data transmission function according to the invention.

A block diagram in FIG. 1 shows an embodiment of a radio selective calling receiver with infrared data transmission function according to the invention.

In FIG. 1, an antenna 1 is connected to a radio section 2, which in turn is connected through a wave shaping circuit 3 to a decoder 8. The decoder 8 is connected to a clock oscillator 9 for inputting clock signals and generating various sorts of timing signals. Also the decoder 8 is connected to an LED circuit 4 for lighting a light emitting diode (LED) so as to conduct call notification and a speaker drive circuit 5 for making a speaker 6 ring so as to conduct call notification.

A central processing unit (CPU) 10 and the decoder 8 are connected by a system bus 11 and also by a control signal line 17 giving/receiving infrared data transmission control signals.

To the system bus 11 are connected an electrically erasable programmable read only memory (EEPROM) 12 storing self call numbers, a read only memory (ROM) 13 storing program being processing procedure of the CPU 10 and a random access memory (RAM) 14 for temporarily storing data and various sorts of variables generated during processing operation of the CPU 10.

Further connected to the system bus 11 is a parallel/serial converter (SIO) 19 for converting parallel data stored in the RAM 14 into serial data and supplying the converted data to an infrared interface transmission section (hereinafter referred to as "infrared I/F transmission section) 20.

Here, the infrared I/F transmission section 20 corresponds to an infrared data transmission section and is provided with a drive circuit and an infrared emitting element.

An infrared data transmission switch 15 operated externally is connected to the CPU 10.

A step-up circuit 23 for stepping-up voltage of a primary power source 22 such as a dry cell supplies the stepped-up DC power source to a control circuit section 18 including the CPU 10, the decoder 8 and the like and a data external output section 21 comprising the SIO 19 and the infrared I/F transmission section 20. The primary power source 22 is supplied through a switch 24 to a radio section & call notification section 7 including the radio section 2, the wave shaping circuit 3, the LED circuit 4, the speaker drive circuit 5 and the like. A control signal line 16 extending from the decoder 8 is connected to a control terminal of the switch 24, which is switched by radio section operation control signals from the decoder 8.

Figure 2:
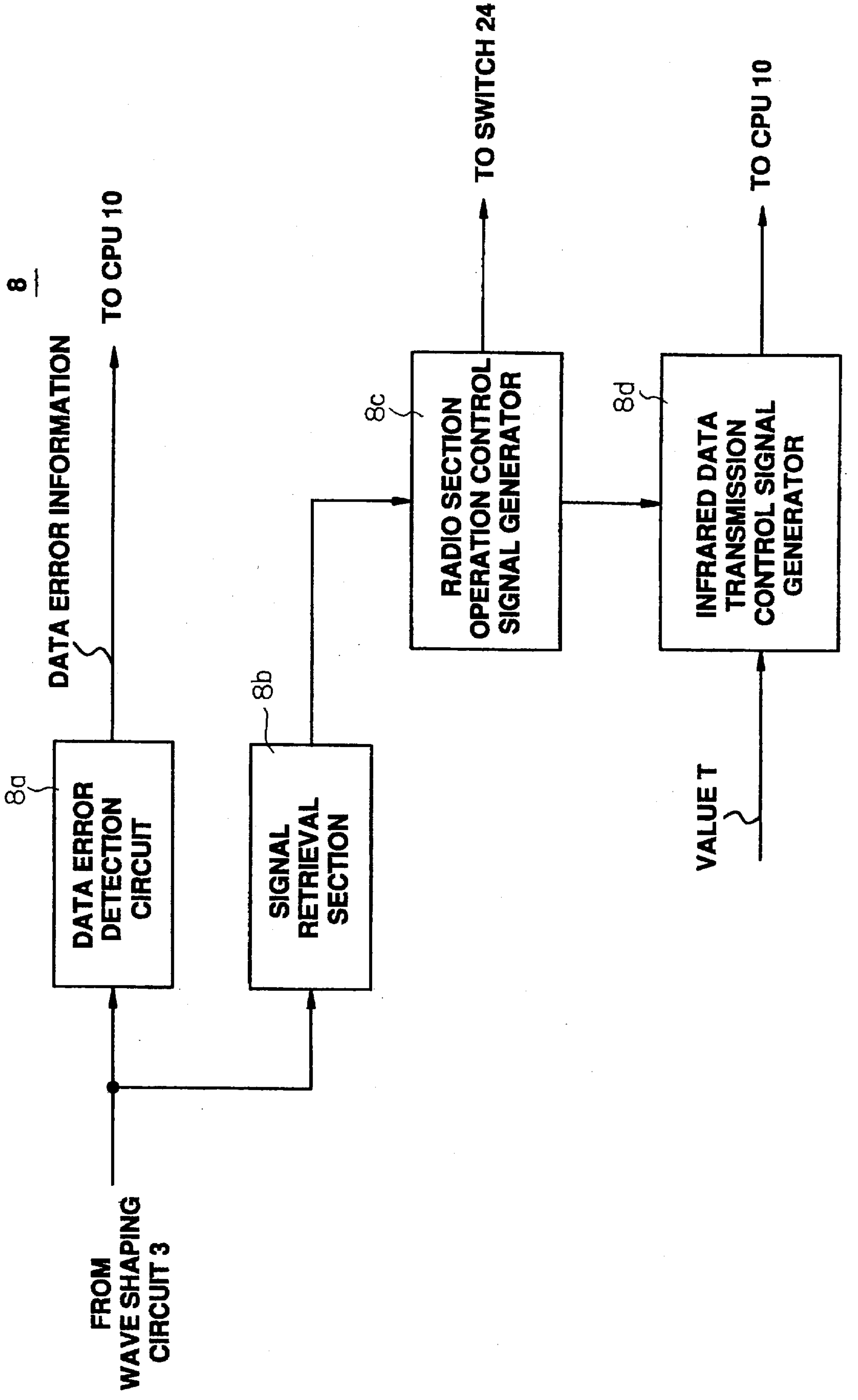
FIG. 2 is a block diagram of main part function of the decoder shown in FIG. 1.

The decoder 8 as shown in FIG. 2 has a data error detection section **8*a*, a signal retrieval section 8*b*, a radio section operation control signal generator 8*c* and an infrared data transmission control signal generator 8*d*. The signal retrieval section 8*b* detects signals to be detected, for example, a POCSAG signal. The radio section operation control signal generator 8*c* supplies radio section operation control signals to control operation of the radio section to the switch 24 by the detected POCSAG signal. The infrared data transmission control signal generator 8***d* supplies infrared data transmission control signals indicating the infrared data to be transmitted at the OFF state of the radio section to the CPU 10. The data error detection section 8*a* detects data error of the detected POCSAG signal and supplies data error information to the CPU 10.

Figure 3:
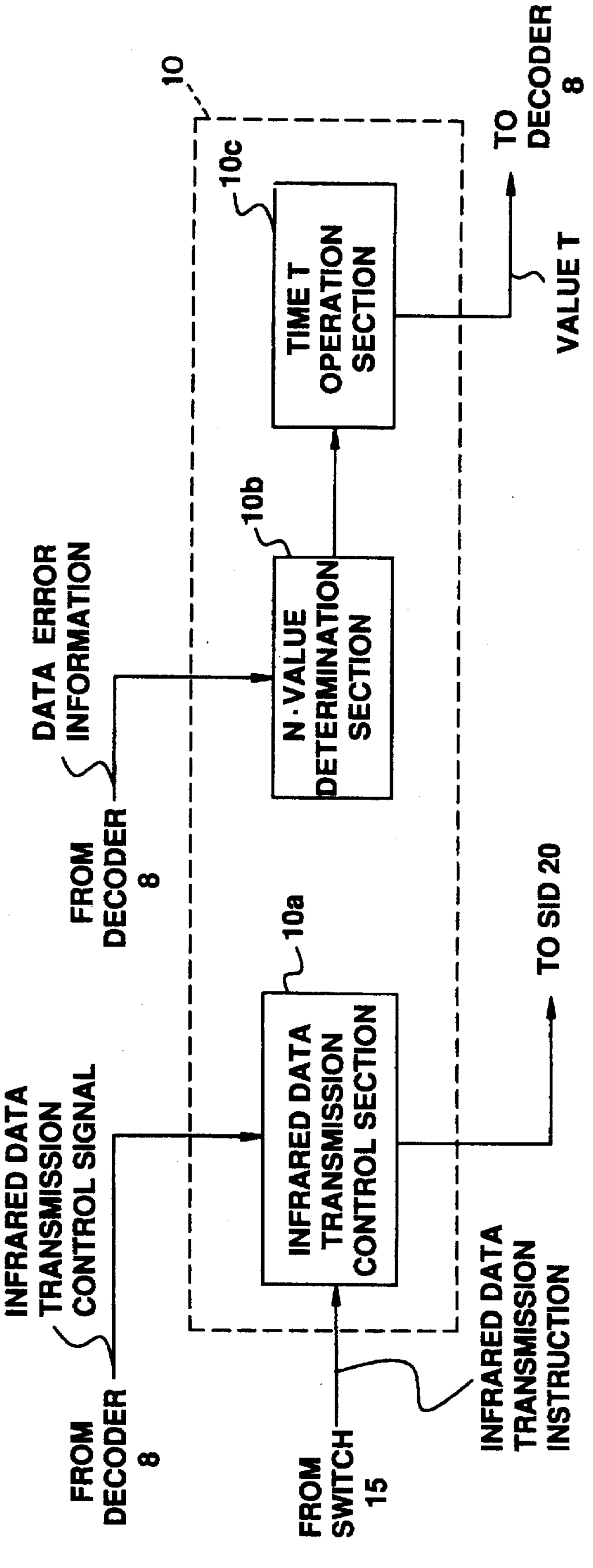
FIG. 3 is a block diagram of main part function of the CPU shown in FIG. 1.

The CPU 10 as shown in FIG. 3 has an infrared data transmission control section 10*a*, an N-value determination section 10*b* and a time T operation section 10*c*. When infrared data transmission instruction is inputted from the infrared data transmission switch 15, the infrared data transmission control section 10*a* controls sending of data to the SIO 19 if the infrared data transmission control signal is allowable. The N-value determination section 10*b* determines N to control the time T by the data error information from the decoder 8. The time T is expressed by A+B*N. Where A, B are positive integers respectively.

The decoder 8 as described later constitutes control means so that operation of the radio section 2 and operation of the infrared I/F transmission section 20 are not overlapped, and operation of the infrared I/F transmission section 20 is stopped at the definite time (T) before start of operation of the radio section 2.

The CPU 10 as described later conducts the control so that reception information stored within the RAM 14 is read out and the read-out information is sent to the infrared I/F transmission section 20, and also the CPU 10 conducts the operation so that timing of stopping the transmission operation of the infrared I/F transmission section 20 is changed corresponding to the ratio of data received in the radio section 2.

Next, operation of the radio selection call receiver constituted in such manner will be described.

A radio signal received in the antenna 1 is amplified and demodulated in the radio section 2, and then shaped by the wave shaping circuit 3 into a waveform which can be read by the decoder 8*a*. In the decoder 8, call number in the signal from the wave shaping circuit 3 and a call a number of previously written in the EEPROM 12 are compared with each other, and if both are coincident, the message signal and data succeeding the call number are outputted to the CPU 10.

In the CPU 10, processing of error detection and error correction is conducted regarding the message signal and data, and a notification signal notifying the calling is outputted to the decoder 8. On receiving the notification signal from the CPU 10, the decoder 8 outputs a ringing signal to the speaker drive circuit 5 and the speaker 6 rings and also a drive signal is sent to the LED circuit 4 and the LED is lit.

In the CPU 10, when data at the self call number and the message signal are received from the decoder 8, these are stored in the RAM 14. The data and the message signal stored in the RAM 14 are in standby state until they are outputted to the outside by infrared data transmission.

Now, if the infrared data transmission switch 15 is pushed down by external operation, the CPU 10 is deemed to receive the infrared data transmission request. Then the data and the message signal stored in the RAM 14 are outputted to the SIO 19. In the SIO 19, parallel data from the RAM 14 are converted into serial data and supplied to the infrared I/F transmission section 20.

Thereby data are outputted from the infrared I/F transmission section 20 to external terminals or the like by infrared ray.

Usual operation has been described.

Next, a control method will be described where infrared data transmission operation is stopped during reception operation of the radio section so that both the radio section 2 and the infrared I/F transmission section 20 do not operate simultaneously.

Figures 4A, 4B, 4C:
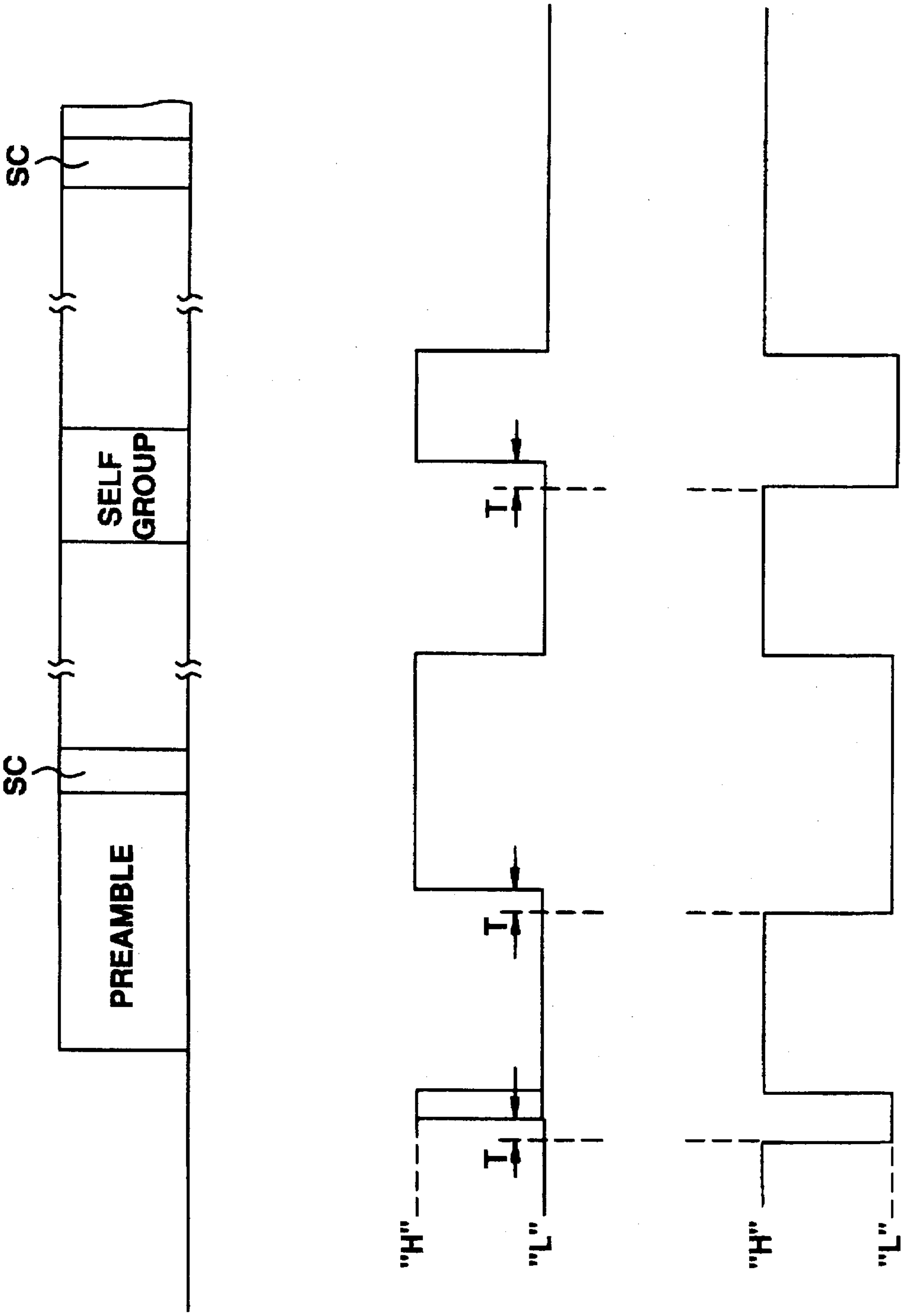
FIGS. 4*a*, 4*b* and 4*c* are timing chart showing an operation control signal of a radio section and an infrared data transmission control signal.

FIG. 4(*a*) shows a batch stream of a signal format by POCSAG system as an example. FIG. 4(*b*) shows a radio section operation control signal sent from the decoder 8 to the switch 24.

This control signal is generated in the radio section operation control signal generator 8*c* within the decoder 8. At high "H" state, the switch 24 is closed and the control signal is supplied, and at low "L" state, the switch 24 is opened and the control signal is not supplied. Consequently during the "H" period, the power source is supplied to the radio section & call notification section 7 and the radio section 2 is operated, and during the "L" period, the power source is interrupted thereby the operation of the radio section 2 is stopped.

By such intermittent operation of the radio section 2, the decoder 8 retrieves the POCSAG signals. When the decoder 8 detects preamble (front end bit train) in the POCSAG signals sent from the radio section 2 through the wave shaping circuit 3, the switch 24 is closed and the power source of the radio section 2 is turned on intermittently and a synchronous signal (SC) is retrieved in the signal retrieval section 8*a*.

Further after the retrieval of the synchronous signal, the switch 24 is controlled again and the radio section 2 is operated intermittently, and the power source of the radio section 2 is controlled to be turned on again at the transmission timing of a signal directed to the self device and a signal of the self group can be received. Thus the power source control of the radio section 2 is conducted by the decoder 8 and unnecessary operation of the radio section 2 is not conducted.

While the power source of the radio section 2 is turned off by the decoder 8, infrared data can be transmitted to the outside. FIG. 4(*c*) shows an infrared data transmission control signal sent from the decoder 8 to the CPU 10. The control signal is generated in the infrared data transmission control signal generator 8*d* within the decoder 8. The control signal becomes allowance of infrared transmission operation at "H", and becomes stop of infrared transmission operation at "L".

Here, the changing timing of the infrared data transmission operation and the operation of the radio section 2 will be described.

At definite time after transferring of the infrared transmission operation from the transmission state to the transmission stop state, noise radiation from the step-up circuit 23 exists. Therefore the infrared data transmission control signal is sent from the decoder 8 to the CPU 10 so that the infrared transmission stop is finished at the definite time T before operation start of the radio section. On receiving the control signal shown in FIG. 4(*c*), the infrared data transmission control section 10*a* within the CPU 10 controls the data transmission and stop to the infrared I/F transmission section 20.

Figure 5:
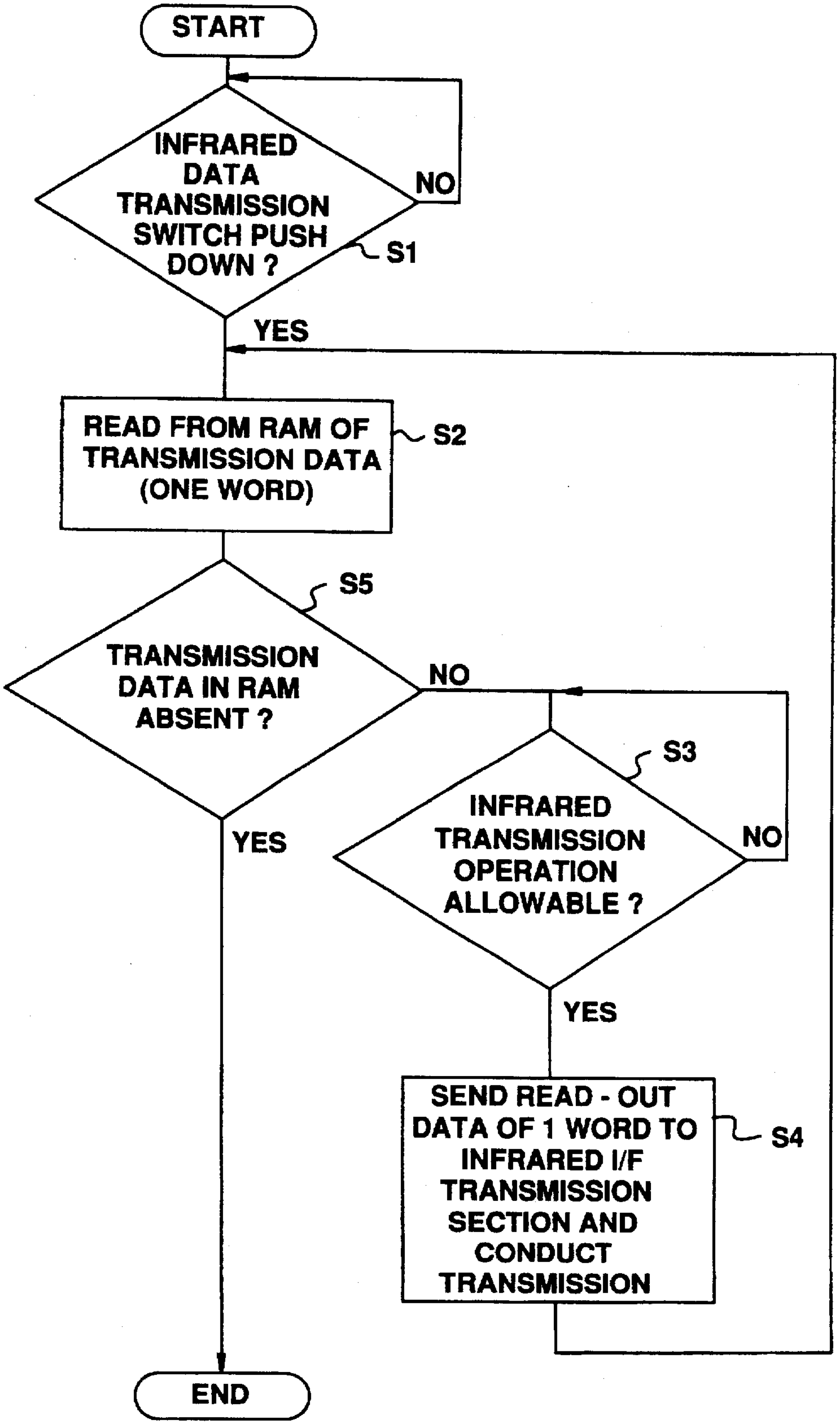
FIG. 5 is a flow chart showing infrared data transmission processing operation.

FIG. 5 is a flow chart showing external transmission operation of infrared data based on the control.

In FIG. 5, transmission data are stored in the RAM 14, and the infrared data transmission switch 15 is pushed down (step S1). Then the CPU 10 reads out one word of the transmission data from the RAM 14 (step S2), and an infrared data transmission control signal from the decoder 8 is confirmed. If the control signal is transmission stop, wait until the infrared transmission operation becomes allowable (step S3). If the infrared transmission operation becomes allowable (step S3), the CPU 10 sends data of one word through the SIO 19 to the infrared I/F transmission section 20. Thereby the data are transmitted from the infrared I/F transmission section 20 to the outside by infrared ray (step S4).

And then, operation from step S2 to step S4 is repeated, and when no transmission data exist in the RAM 14 (step S5), the transmission is finished.

The decoder 8 sends the infrared data transmission control signal to the CPU 10 so that the infrared transmission stop is finished at the definite time T before start of the radio section operation. In this case, the time T between the infrared transmission stop and the radio section operation start is changed corresponding to the data error state (data error ratio) of the radio section 2, thereby reliability of the reception operation in the radio section 2 can be improved.

Based on this idea, the CPU 10 conducts the operation of changing the time T corresponding to the data error state in the radio section 2 detected in the data error detection section 8*a* of the decoder 8.

The data error information from the decoder 8 enters the N-value determination section 10*b* of the CPU 10. In the time T operation section 10*c* within the CPU 10, operation of changing T is conducted by arithmetic expression $T=A+B\times N$. Thereby the value of N can be increased or decreased in the N-value determination section 10*b* corresponding to the data error state and the time T can be lengthened by the operation in the operation section 10*c*. The determined value of the time T is returned to the decoder 8.

Figure 6:
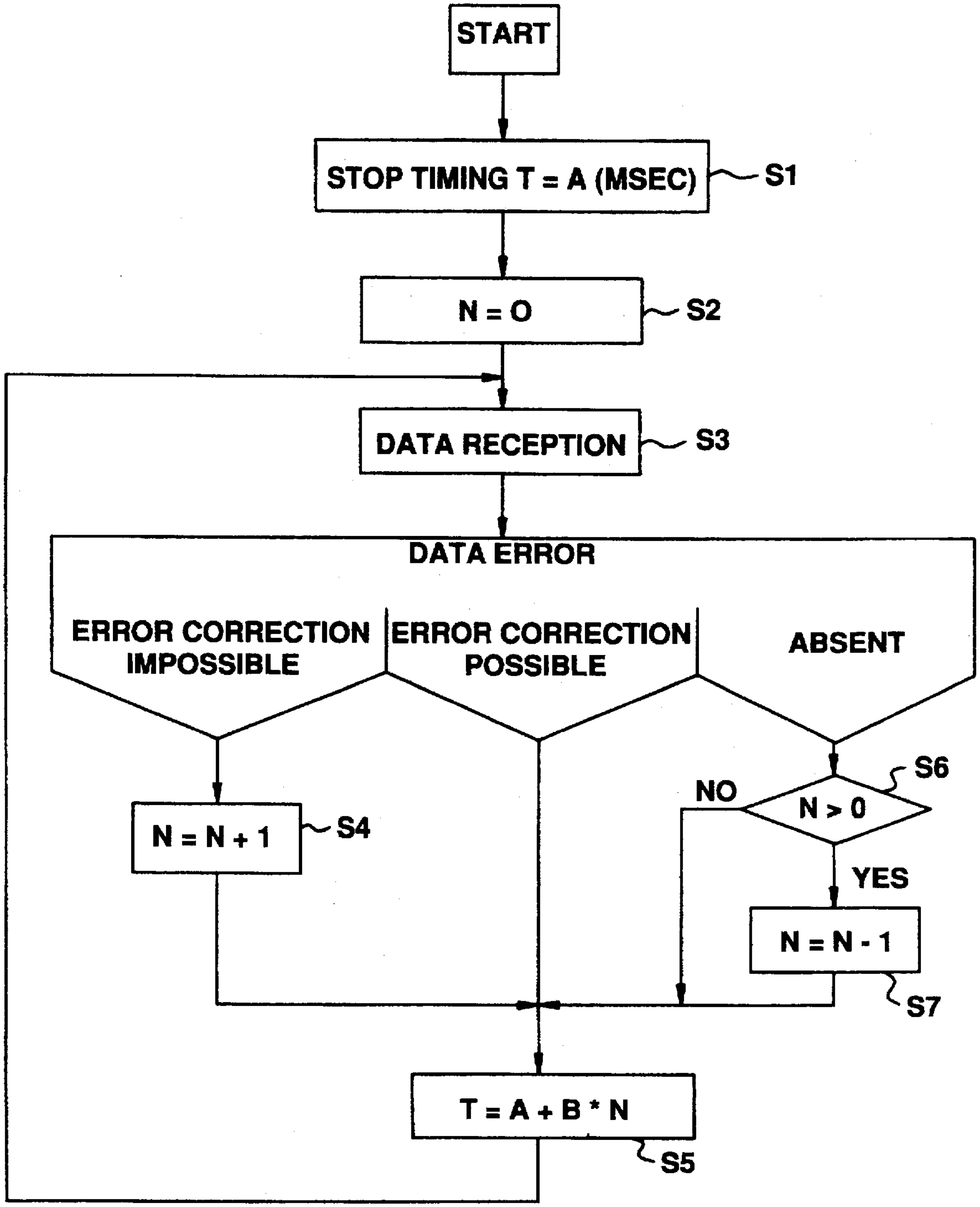
FIG. 6 is a flow chart showing procedure to change transmission stop timing of an infrared I/F transmission section.

FIG. 6 is a flow chart to change the operation timing of the radio section 2 and the infrared I/F transmission section 20. In FIG. 6, as the definite time T being infrared transmission stop timing, the standard time T=A (msec) is first prepared (step S1).

At first, it is assumed that N=0, and reception of data is conducted (steps S2 to S3).

If error of the received data cannot be corrected, 1 is added to N in the N-value determination section 10*b* by processing of step S4, and using the enlarged value of N, the operation of determining the time T is conducted in the operation section 10*c* (step S5). Thereby the reception of data is conducted at the timing of lengthening the time T in step S3. Among the received data, if the data error can be corrected, the value of N is not changed but the reception of data is conducted in step S3 at the timing of the time T determined by the operation of step S5.

Among the received data, if there is no data error and N>0, the value of N is changed by subtracting 1 from N (steps S6 to S7). Using the subtracted value of N, the operation of determining the time T is conducted in step S5, and the reception of data is conducted in step S3 at the timing of the determined time T.

Thus when the error correction becomes possible, the value of the time T is fixed, and when the error is eliminated, the value of N is gradually decreased and the value of T is shortened.

Although the radio selection call receiver is used in the above-mentioned embodiments, the present invention is not limited to this, but can be applied also to other communication apparatuses.

According to the present invention as above described, at the operation state of the radio section, the transmission operation in the infrared data transmission section is stopped, thereby the operation of the radio section and the infrared data transmission operation to the outside are not overlapped, and influence of noise plunging from the step-up circuit into the radio section is eliminated and determination of the reception sensitivity in the radio can be prevented.

Also according to the invention, the transmission operation in the infrared data transmission section is stopped at the definite time before the operation start of the radio section, thereby the noise remaining in the step-up circuit after stopping the infrared transmission operation does not affect the radio section and deterioration of the reception sensitivity in the radio section can be prevented.

Also according to the invention, the intermittent operation of the radio section is controlled in the decoder, and the transmission operation in the infrared data transmission section is controlled to be stopped at the definite time before the operation start of the radio section, and there is a merit that the timing can be easily controlled so that the operation of the radio section and the infrared data transmission operation are not overlapped.

Also according to the invention, the transmission stop timing in the infrared data transmission section is varied corresponding to the error ratio of the received data in the radio section, thereby there is a merit that the reliability of the reception operation in the radio section can be improved.

While the invention has been described with reference to specific embodiments thereof, it will be appreciated by those skilled in the art that numerous variations, modifications, and embodiments are possible, and accordingly, all such variations, modifications, and embodiments are to be regarded as being within the spirit and scope of the invention.

What is claimed is:

1. A communication apparatus with infrared data transmission function comprising:

radio means for receiving radio signals memory means for storing reception information contained in said radio signals;

infrared data transmission means for transmitting the reception information stored in said memory means by infrared ray;

infrared data transmission control means for supplying the reception information to said infrared data transmission means and for controlling said infrared data transmission means so that the reception information can be transmitted from said infrared data transmission means; and control means for stopping the transmission operation of said infrared data transmission means when said radio means is operated;

said control means having signal detecting means for detecting whether or not a radio signal received in said radio means is a signal designated to be received, radio means operation control signal generating means for outputting a control signal to control the operation of said radio means by the detection result of said signal detecting means, and infrared data transmission control signal generating means for effecting a decision whether said radio means is operated or not and for outputting a signal to said infrared data transmission control means to stop the transmission operation when said radio means is operated.

2. A communication apparatus as set forth in claim 1, wherein said infrared data transmission control means effects a decision whether or not a signal to stop the transmission operation is to be supplied to said infrared data transmission control means.

3. A communication apparatus a set forth in claim 1, wherein said communication apparatus is a radio selective calling receiver.

4. A communication apparatus with infrared data transmission function comprising:

radio means for receiving radio signals;

memory means for storing reception information contained in said radio signals;

infrared data transmission means for outputting the reception information stored in said memory means by infrared ray;

infrared data transmission control means for supplying the reception information to said infrared data transmission means and for controlling said infrared data transmission means so that the reception information can be transmitted from said infrared data transmission means; and control means for stopping the transmission operation by said infrared data transmission means at a predetermined time before the operation start of said radio means;

said control means having signal detecting means for detecting whether or not a signal received in said radio means is a signal designated to be received, radio means operation control signal generating means for outputting a control signal to control the operation of said radio means by the detection result of said signal detecting means, and infrared data transmission control signal generating means for effecting a decision whether said radio means is operated or not and for outputting a signal to stop the transmission operation before the operation start of said radio means.

5. A communication apparatus as set forth in claim 4, wherein said infrared data transmission control means effects a decision whether or not a signal to stop the transmission operation is to be supplied to said infrared transmission means.

6. A communication apparatus with infrared data transmission function comprising:

radio means for receiving radio signals;

memory means for storing reception information contained in said radio signals;

infrared data transmission means for outputting the reception information stored in said memory means by infrared ray; and control means for stopping the transmission operation by said infrared data transmission means at a predetermined time before the operation start of said radio means;

signal detecting means for detecting whether a signal received in said radio means is a signal designated to be received or not;

radio means operation control signal generating means for outputting a control signal to control the operation of said radio means by the detection result of said signal detecting means;

infrared data transmission control signal generating means for effecting a decision whether said radio means is operated or not, and for outputting a signal to said infrared data transmission control means to stop the transmission operation before the operation start of said radio means; and data error detecting means for detecting error information of a radio signal received in said radio means.

7. A communication apparatus as set forth in claim 6, further comprising:

infrared data transmission control means for supplying the reception information to said infrared data transmission means and for controlling said infrared data transmission means so that the reception information can be transmitted from said infrared data transmission means.

8. A communication apparatus as set forth in claim 7, said infrared data transmission control means comprising:

decision means for effecting a decision whether or not a signal to stop the transmission operation is supplied to the infrared transmission means;

time generating means for generating a predetermined time; and time control means for controlling the predetermined time based on data error information from said data error detecting means.

9. A method of controlling transmission of infrared data in a communication apparatus comprising the steps of:

receiving a radio signal with a radio means;

storing reception information received in the radio means;

outputting the reception information stored in the memory means by infrared ray;

supplying the reception information to the infrared data transmission means;

controlling the infrared data transmission means so that the reception information can be transmitted from the infrared data transmission means;

stopping the transmission operation in the infrared data transmission means when the radio means is operated;

wherein said step of stopping the transmission operation includes detecting whether a signal received in the radio means is a signal to be received or not, outputting a control signal to control the operation of the radio means by the detection result of the signal detecting means, and effecting a decision whether the radio means is operated or not and outputting a signal to stop the transmission operation when the radio means is operated.

10. A method as set forth in claim 9, said step of controlling the infrared data transmission means comprising the further step of:

effecting a decision whether or not a signal to stop the transmission operation is to be supplied to said infrared data transmission means.

11. A method of controlling transmission of infrared data in a communication apparatus comprising the steps of:

receiving a radio signal with a radio means;

storing reception information contained in the radio signal in a memory means;

outputting the reception information stored in the memory means by infrared ray;

supplying the reception information to the infrared data transmission means;

controlling the infrared data transmission means so that the reception information can be transmitted from the infrared data transmission means; and stopping the transmission operation in the infrared data transmission means at a predetermined time before the operation start of the radio means;

wherein said step of stopping the transmission operation includes detecting whether or not a signal received in the radio means is a signal designated to be received, outputting a control signal to control the operation of the radio means by the detection result of the signal detecting means, and effecting a decision whether the radio means is operated or not and outputting a signal to stop the transmission operation before the operation start of the radio means.

12. A method as set forth in claim 11, said controlling step comprising the step of:

effecting a decision whether or not a signal to stop the transmission operation is to be supplied to said infrared data transmission means.

13. A method of controlling transmission of infrared data in a communication apparatus comprising the steps of:

receiving a radio signal with a radio means;

storing reception information contained in the radio signal in a memory means;

outputting the reception information stored in the memory means by infrared ray;

stopping the transmission operation in the infrared data transmission means at a predetermined time before the operation start of the radio means;

detecting whether or not a signal received in the radio means is a signal designated to be received;

outputting a control signal to control the operation of the radio means by the detection result of the signal detecting means;

effecting a decision whether or not the radio means is operated and outputting a signal to stop the transmission operation before the operation start of the radio means; and detecting error information of the radio signal received in the radio means.

14. A method as set forth in claim 13, further comprising the steps of:

supplying the reception information to the infrared data transmission means; and controlling the infrared data transmission means so that the reception information can be transmitted from the infrared data transmission means.

15. A method as set forth in claim 14, said controlling step comprising the steps of:

effecting a decision whether or not a signal to stop the transmission operation is to be supplied to said infrared data transmission means;

generating the predetermined time; and controlling the predetermined time based on the data error information from the data error detecting means.

* * * * *